No. 880,208. PATENTED FEB. 25, 1908.
J. E. GERMAIN & G. A. OSSART.
OPTICAL LENS.
APPLICATION FILED MAR. 8, 1907.

2 SHEETS—SHEET 1.

WITNESSES
David Levine
H. J. Suhrbier.

INVENTORS
Jules Eugène Germain
Georges Arsène Ossart
BY
Soruel & Goepel
ATTORNEYS No. 880,208. PATENTED FEB. 25, 1908.
J. E. GERMAIN & G. A. OSSART.
OPTICAL LENS.
APPLICATION FILED MAR. 8, 1907.

2 SHEETS—SHEET 2.

UNITED STATES PATENT OFFICE.

JULES EUGÈNE GERMAIN AND GEORGES ARSÈNE OSSART, OF RUEIL, FRANCE, ASSIGNORS TO JULES ALPHONSE GUSTAVE ROUSSET, OF VINCENNES, FRANCE.

OPTICAL LENS.

No. 880,208.        Specification of Letters Patent.        Patented Feb. 25, 1908.

Application filed March 8, 1907. Serial No. 361,403.

*To all whom it may concern:*

Be it known that we, JULES EUGÈNE GERMAIN and GEORGES ARSÈNE OSSART, citizens of the Republic of France, residing at Rueil, in said Republic, have invented certain new and useful Improvements in Optical Lenses, of which the following is a specification.

This invention aims to provide an optical lens which is applicable to various purposes and characterized by practically perfect aplanatism and achromatism.

It is a further object of the invention to provide a lens in which the image of the different planes, from those situated quite close to the lens to those infinitely distant, is produced sharply and in one and the same focal plane without using a diaphragm.

Figure 1:
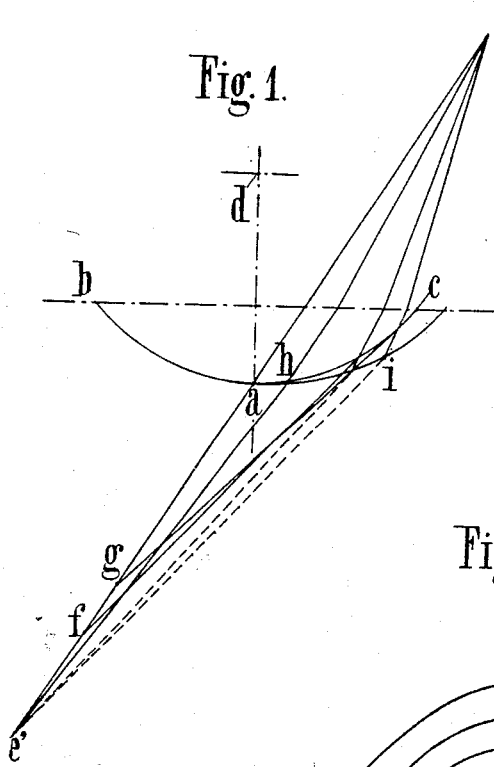
Figure 4:
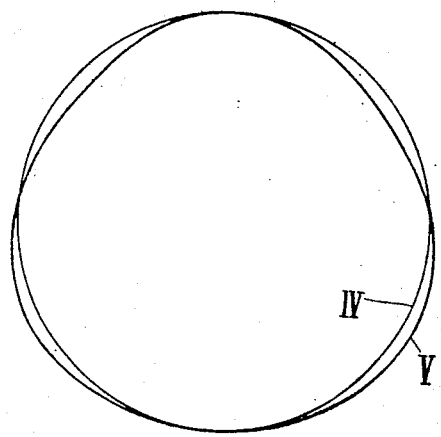
Figure 5:
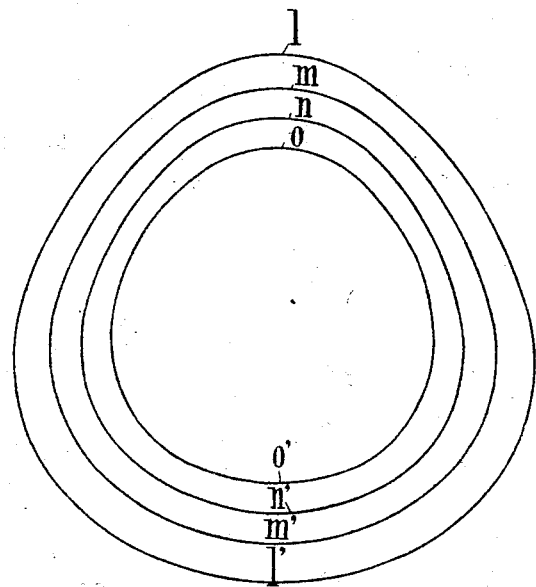
Figure 3:
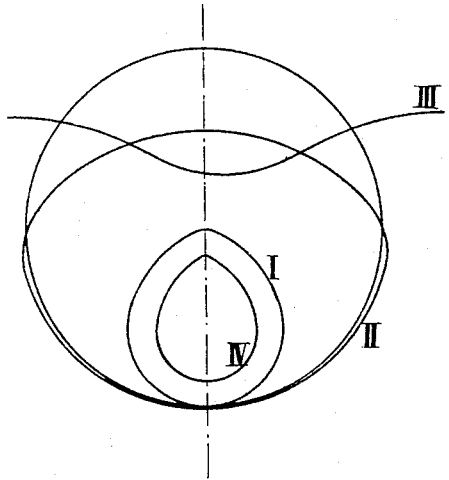
Figure 2:
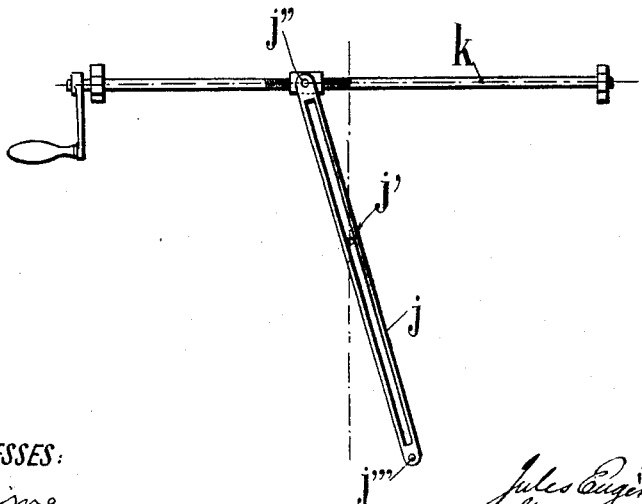

In the accompanying drawing, in which the same reference characters denote the same parts throughout the views, Figure 1 illustrates diagrammatically the form of the lens as compared to an ordinary spherical lens, Fig. 2 shows a device for tracing the meridian curve of the lens, and Figs. 3—5 show curves generated by said device and after which lenses are shaped according to this invention.

The considerations upon which the formation of a lens of this kind are based are as follows: Assuming a plano convex spherical lens, the intersection of which by the plane of the figure is $b\ a\ c$ (Fig. 1) and that $d\ a$ is the radius of the arc of a circle $b\ a\ c$. Assuming also a luminous point $e$ and $e\ a$ as the ray emanating from the point $e$ passing through the optical center. The image of the point $e$ should be formed at $e'$ on the prolongation of the ray $e\ a$ on encountering all the other luminous rays issuing from the point $e$ and refracted by the lens. It is known however that this point of encounter is not a single point, the rays falling near the edge $c$ of the lens intersecting the prolongation of the ray $e\ a$ much nearer the lens than those falling near the center. It is therefore necessary to cause the position of the point $e'$ to vary, or by causing it to vary very slightly to make the points such as $f$ and $g$ to coincide with the point $e'$. In accordance with the invention, this result is obtained by modifying the form of the exit surface of the lens, in such a manner that the meridian of this surface which from the summit $a$ to the point $h$ almost coincides with the circular arc $a\ c$, separates from it progressively, while being external to it from $h$ to $i$. In these conditions the rays emanating from the point $e$ after their refraction in the lens meet at one and the same point $e'$.

If in place of a plano-convex lens a convergent bi-convex meniscus be considered, it will be understood that the modification of the luminous rays on leaving the lens may be obtained in two ways; either as just stated, by modifying the discharge surface, or by modifying the admission surface in order to modify, by this very fact, the direction in the interior of the lens of the refracted rays and consequently the direction of the rays leaving the lens. These two methods may however be combined; finally the meridian deformation curves may be internal to the meridian circle of the spherical lens in question, if it is desired to diminish the distances of the focal plane. Starting from these considerations, it was first of all necessary to provide an apparatus permitting of tracing in a continuous manner in a plane, the deformation curves for replacing the meridian circle of a spherical lens. This apparatus as shown in Fig. 2 consists broadly of a bar $j$ capable of sliding and turning around a fixed pivot $j'$, one extremity $j''$ provided with a nut being traversed by a screw $k$. At the other extremity of the bar $j$ there is fixed a pencil $j'''$. When the screw $k$ is turned, the bar $j$ slides over the pivot $j'$ and at the same time turns about it, and the pencil describes a curve such as the curve I represented in Fig. 3.

By modifying the position of the pivot $j'$ relatively to the extremity $j''$ of the bar, curves are obtained like the curve II (Fig. 3) either internal or external to the circle taken as base. Concentric curves may be obtained by displacing the pencil $j'''$ and the position of the fixed pivot $j'$ simultaneously by the same amount; the curve IV concentric with the curve I is obtained in this manner. In the same way the pencil may be placed between the extremity $j'''$ of the bar and the fixed pivot $j'$; the curve described is then analogous to that indicated at III, Fig. 3. The pencil may also be placed at the prolonged extremity $j''$ of the bar. Instead of the extremity $j''$ of the bar describing a straight line, it may be compelled to describe a circle. In this case the screw is replaced by a disk. The curves obtained are analogous to the preceding curves. Fig. 4 shows the curve V described by starting from the circle VI as base. Concentric curves are obtained, Fig. 5, by moving the pencil up by a certain amount and by decreasing the radius of the circle described by the extremity of the bar opposite to the pencil, by the same amount. If without changing the radius of this circle the fixed pivot is moved towards the pencil increasingly pointed curves are drawn; by displacing the pivot in the opposite direction increasingly elongated curves are obtained. It is therefore possible to draw deformation curves having the same summit and different curvatures, but in as close proximity as desired.

In order to form a lens, the summits of the curves such as those shown in Fig. 5 are combined. For example, if it is desired to form a convergent meniscus, the summits $l\ m\ n\ o\ \ldots$ which form the interior curves internal on the side of the image are combined with the summits $l'\ m'\ n'\ o'\ \ldots$ which will form the exterior curves turned towards the object. It is also possible to combine the curves $l\ m\ n\ o$ or to combine the curves $l'\ m'\ n'\ o'$. The choice of these combinations will be determined by the important fact that in order to obtain a good combination it is essential that the lens tested as a magnifying glass should give a magnification equal from the center to the edge.

The curve generated by the device described and which forms the meridian curve of the lens is a conchoid. When the extremity $j''$ describes a straight line the curve generated is a conchoid of a line or a lineal conchoid; its equation, of the fourth degree, is $(x^2+y^2)(x-a)^2 = l^2x^2$. When said extremity describes a circle the curve generated is a conchoid of a circle; its equation, of the sixth degree, is $(x^2+y^2)(x^2+y^2+a^2+R^2-l^2)^2 = 4R^2(x^2+y^2-ax)^2+4a^2y^2(R^2-l^2)$. Thus the meridian curve of the lens is not formed by deforming a sphere, but is generated and defined geometrically: one can construct the normal at each point by geometry, and it is possible with this meridian to follow geometrically the rays of light.

Both the face through which the light enters and that through which it leaves the lens are conchoidal. The lenses may be formed automatically by a machine in which provision is made for an infinite number of variations in the form given to the conchoids. In this manner the shaping of the lens point by point by a method analogous to that of Foucault, or by means of templets, as is necessary when the form of the lens is obtained by calculation, is avoided.

Having thus described our invention, we claim:

1. An optical lens having a meridian curve which is a true conchoid.

2. An optical lens having the meridian curves of its admission and its exit surfaces conchoidal in form.

3. An optical lens having as its meridian curve a fourth degree curve of the following equation: $(x^2+y^2)(x-a)^2 = l^2x^2$.

In testimony whereof we have signed this specification in the presence of two subscribing witnesses.

JULES EUGÈNE GERMAIN.
GEORGES ARSÈNE OSSART.

Witnesses:
EMILE LEDRET,
DEAN B. MASON.